(12) United States Patent
Paula Junior

(10) Patent No.: US 10,814,923 B2
(45) Date of Patent: Oct. 27, 2020

(54) SECURITY DEVICE ACTUATING A SPARE TIRE BY ELECTRONIC MEANS

(71) Applicant: Joao Clemente De Paula Junior, Goiania (BR)

(72) Inventor: Joao Clemente De Paula Junior, Goiania (BR)

(*) Notice: Subject to any disclaimer, the term of this patent is extended or adjusted under 35 U.S.C. 154(b) by 0 days.

(21) Appl. No.: 16/098,522

(22) PCT Filed: May 3, 2017

(86) PCT No.: PCT/BR2017/050105
§ 371 (c)(1),
(2) Date: Nov. 2, 2018

(87) PCT Pub. No.: WO2017/190208
PCT Pub. Date: Nov. 9, 2017

(65) Prior Publication Data
US 2019/0152545 A1    May 23, 2019

(30) Foreign Application Priority Data
May 3, 2016  (BR) ...................... 10 2016 009957 9

(51) Int. Cl.
*B62D 43/04*    (2006.01)

(52) U.S. Cl.
CPC ......... *B62D 43/045* (2013.01); *Y10T 70/5987* (2015.04)

(58) Field of Classification Search
CPC ...... B62D 43/045; B62D 43/04; B62D 43/06; B66D 1/12; B66D 1/34; B66D 1/39; B66D 3/26; B66D 1/16; B66D 1/30; B66D 1/36; B60P 7/0846

USPC ................ 414/463; 254/362; 242/157 R
See application file for complete search history.

(56) References Cited

U.S. PATENT DOCUMENTS

| | | | | |
|---|---|---|---|---|
| 2,906,501 A | * | 9/1959 | Brell | E02F 3/10 414/560 |
| 2,947,517 A | * | 8/1960 | Simonsen | B66D 1/12 254/345 |
| 4,497,471 A | * | 2/1985 | Longberg | B63B 21/22 114/179 |
| 4,548,540 A | * | 10/1985 | Renfro | B62D 43/045 206/304 |
| 4,613,273 A | * | 9/1986 | Wagner | B62D 43/045 224/42.23 |
| 4,969,630 A | * | 11/1990 | Denman | B62D 43/045 254/323 |

(Continued)

*Primary Examiner* — Gregory W Adams
(74) *Attorney, Agent, or Firm* — Bay State IP, LLC

(57) ABSTRACT

A safety Device for electro-electronic driving for the spare tire, externally and, fixed at the bottom of the vehicle, allowing said spare wheel and tire to be moved up and down by electronic command from inside the vehicle, the safety Device is provided with one upper body (1), with one anterior side (4) fixed to one horizontal tube (2) and one vertical tube (14), being said anterior side (4) interlinked to one posterior cover (5) by prisoners (7) with washers (p) in the bores (9) of said posterior cover (5) wherein one micro engine is fixed (15) in the sense that the axis (22) of said micro engine is fitter on the channel (12) of the metallic reel (10), allowing the motion of said metallic reel (10) to both sides, causing one motion tape to spin (16) up and down, hoisting and descending the wheel with the spare tire.

4 Claims, 3 Drawing Sheets

(56) References Cited

U.S. PATENT DOCUMENTS

| | | | |
|---|---|---|---|
| 5,718,411 A | 2/1998 | Baughan et al. | |
| 6,435,479 B1 * | 8/2002 | Raz | B62D 43/045 |
| | | | 224/42.23 |
| 6,991,417 B2 | 1/2006 | Reznar | |
| 7,410,336 B2 * | 8/2008 | Parks | B60P 7/0846 |
| | | | 279/144 |
| 7,431,268 B2 * | 10/2008 | Steiner | B62D 43/045 |
| | | | 224/42.23 |
| 7,487,952 B2 | 2/2009 | Murphy | |
| 7,487,953 B2 | 2/2009 | Sauner et al. | |
| 8,210,404 B2 | 7/2012 | Reidl et al. | |
| 8,434,742 B2 * | 5/2013 | Akhavein | B66D 3/006 |
| | | | 254/344 |
| 8,714,419 B2 | 5/2014 | Pulice et al. | |
| 2003/0021662 A1 * | 1/2003 | Ramsey | B62D 43/045 |
| | | | 414/463 |
| 2006/0104768 A1 * | 5/2006 | Park | B62D 43/045 |
| | | | 414/463 |
| 2013/0256344 A1 | 10/2013 | Kowalik | |

* cited by examiner

Figura 1
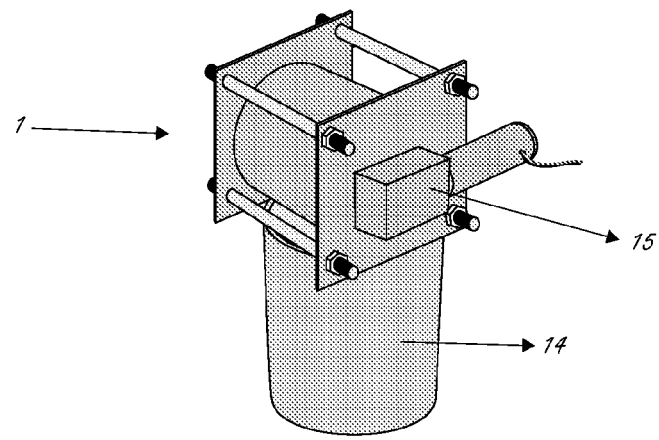
Figura 2
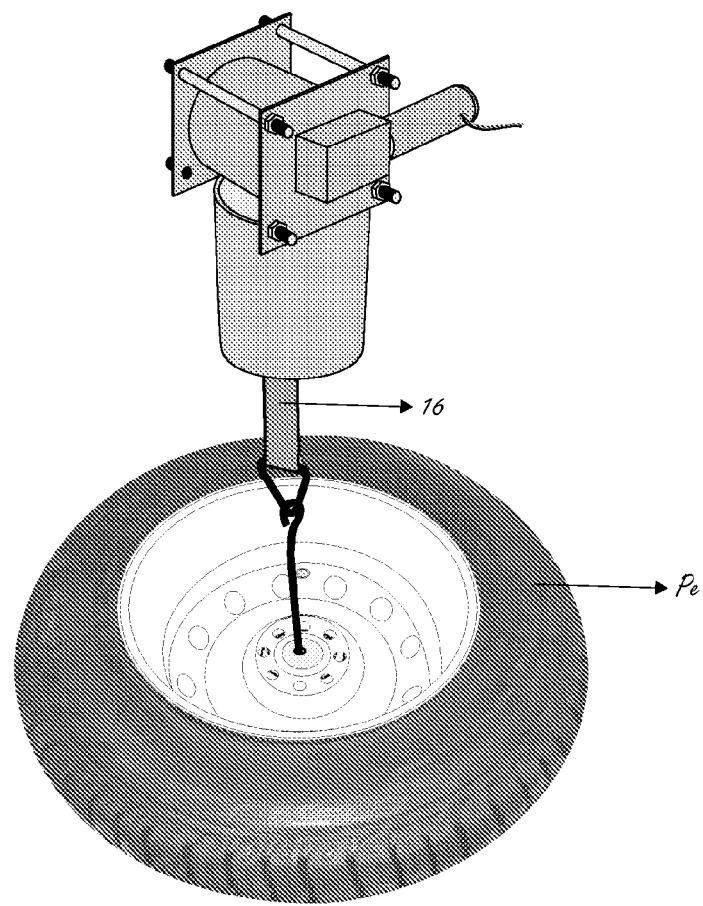

Figura 3
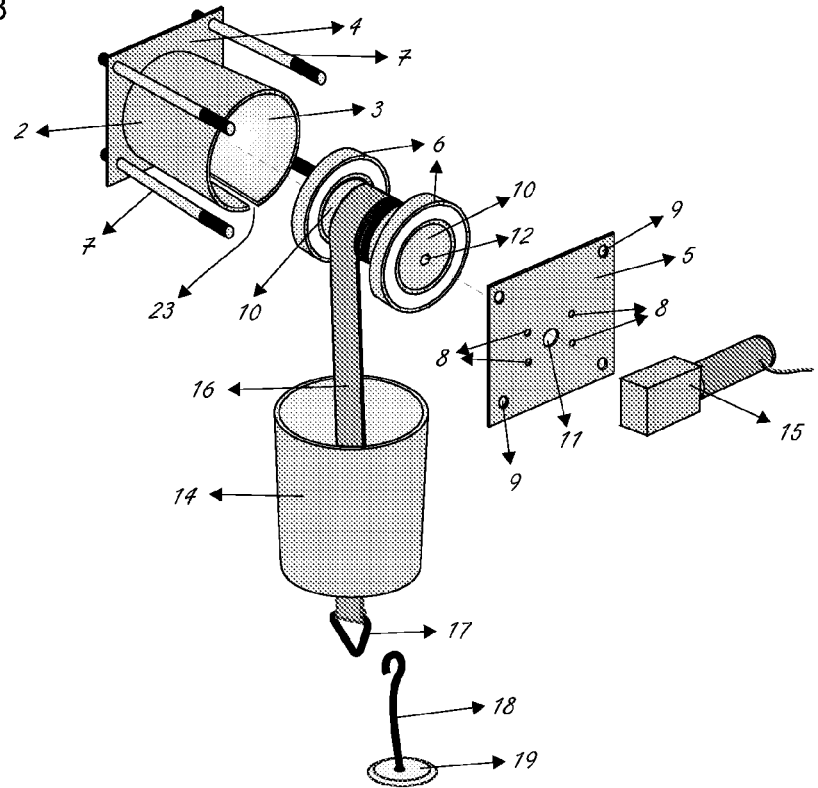
Figura 4
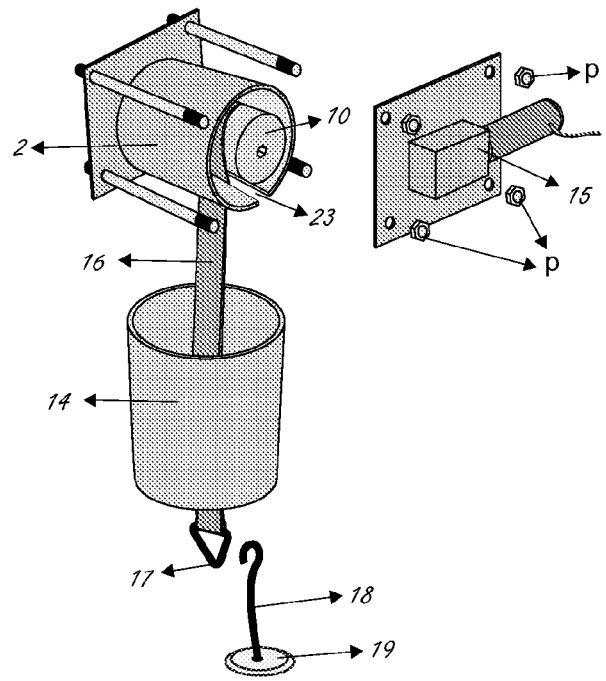

Figura 5
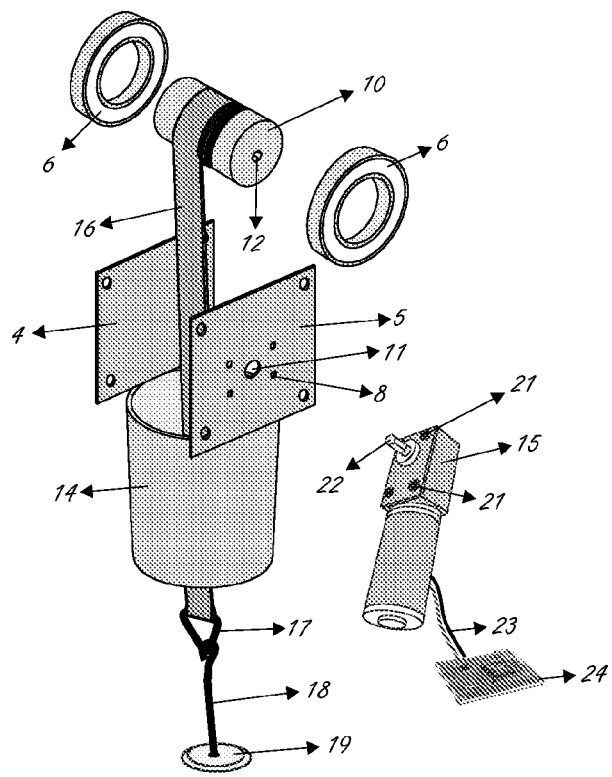
Figura 6
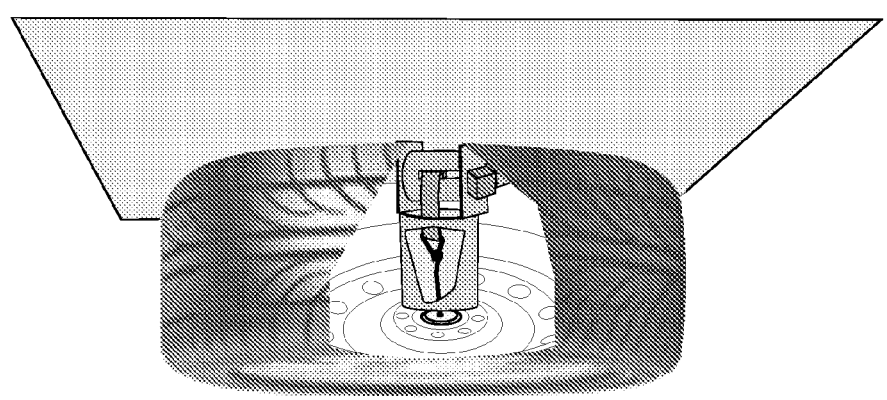

SECURITY DEVICE ACTUATING A SPARE TIRE BY ELECTRONIC MEANS

CROSS REFERENCE TO RELATED APPLICATION

This application is for entry into the U.S. National Phase under § 371 for International Application No. PCT/BR2017/050105 having an international filing date of May 3, 2017, and from which priority is claimed under all applicable sections of Title 35 of the United States Code including, but not limited to, Sections 120, 363, and 365(c), and which in turn claims priority under 35 USC 119 to Brazil Patent Application No. 10 2016 009957 9 filed on May 3, 2016.

This Invention patent refers to a safety Device for electro-electronic driving for the wheel and spare tire, which is provided with a wheel elevation mechanism through an automated means, allowing the driving to be made by an electronic command from inside the vehicle, and, which uses a motion tape, from up to down, of the wheel and spare tire which is protected from the action of wrongdoers against theft by means of cutting tools, being said motion tape rolled and unrolled inside said Device, by a metallic reel spinning in two directions upon being triggered by an electrical engine, provided with electronic components allowing triggering with round-trip course with end-of-course.

The theft of tires and spare wheels is recurrent in vehicles of all brands and makes. For the specific case of vehicles using spare wheel hoisting mechanisms through a steel cable, the problem consists in the fragility of the steel cable added to the potentiation of cutting tools like cutters which currently have cutting capability with great ease for high-gauge steel cables, once said steel cable is normally exposed from the hoisting mechanism to the connection with the spare wheel.

Thus, the problem one aims at solving is exactly the fragility and the ease of cutting the steel cable, given the exposure thereof, as well as an electro-electronic device, provided with a hoisting mechanism which allows a better conduction of the motion tape, which replaces the traditional steel cables commonly used to descend or suspend the spare wheel, as well as for the protection thereof, eliminating for once all possibilities of cutting of the hoisting cable holding the spare wheel.

Therefore, in face of the problems reported and, with the purpose of overcoming them, we developed this Invention patent, which shall be better understood with the aid of the attached pictures, wherein:

FIG. 1 represents a perspective view of the Device.

FIG. 2 represents the same view as FIG. 1, but illustrating the elevation of the spare tire and wheel.

FIG. 3 represents a blown-up view.

FIG. 4 represents a perspective view, with the side Cover of the electric engine separated, allowing an internal view of the motion mechanism.

FIG. 5 shows a perspective view of the represented one perspective view, blown-up at the elevation mechanism and at the electric engine.

FIG. 6 illustrates a side cut at a spare wheel and tire, allowing a side view, installed under the vehicle with said wheel at the end of its course.

Pursuant to how much the figures attached illustrate, in order to solve said problem, and to provide a different mechanism from the state-of-the-technique, a new system was developed for hoisting, which replaces the traditional steel cable, with a tape manufactured in high-tenacity polyester, malleable and with excellent resistance to abrasion, equally to the tapes used by practitioners of mountain climbing and abseiling, i.e., in vertical activities.

Thus, the safety Device is provided with an upper body (1), with one anterior side (4) fixed to one horizontal tube (2) and one vertical tube (14), being said anterior side (4) interlinked to one posterior cover (5) by at least four prisoner pins (7) with washers (p) on the bores (9) of said posterior cover (5) which also has bores (8) for fixation by screws, of the micro engine (15) through threaded bores (21) provided in its shell.

The elevation mechanism of that safety Device is formed by the insertion, in the horizontal tube (9), of one metallic reel (10) fixed by bearings (6) on both ends as seen in FIG. 3 so as, when closing the posterior side with the posterior cover (5), the axis (22) of the micro engine is fitted to the channel (12) of said metallic reel (10), allowing the motion of said metallic reel (10) to both sides, causing the motion tape (16) to spin up and down.

The motion tape (16) is fixed to the metallic reel (10) and wound over itself, so as the micro engine (15), upon being driven, shall spin said metallic reel (10) in the sense of moving said Tape (16) to one side or another, and, with that, to make the motion of the spare wheel and tire, up or down, running through one channel (23) consisting of one tear in the body of the horizontal body (2) and allowing said tape (16) to be wound and unwound to the inside of said horizontal tube (2) winding and unwinding itself around the metallic reel (10).

Considering that, at the extremity of said motion tape (16), one type of triangular step board (17) by means of a seam or another fusion process, in the sense that said triangular step board (17) can receive by fitting the tip of the rod (17), which has a lower base (19) intended to be inserted in the central bore o the spare wheel and to allow the fitting of said triangular step board (17) in order to hoist the when with the spare tire, the rod (17) with the end of the motion tape (16) to be protected against cuts inside the vertical metallic tube (14) as seen, both in FIG. 1, and in FIG. 6.

The micro engine (15) is interlinked to a PCI central (24), which shall perform the energy management to feed the micro engine (15), as well as the programming of the motion course from one side to another, of the motion mechanism, in addition to the end of course, both up and down.

This Device may be manufactured for any vehicle make using a spare wheel and tire fixed externally at the bottom of the vehicle, and in which said spare wheel and tire is driven through the motion up and down, when used.

The invention claimed is:

1. SAFETY AND DRIVING DEVICE OF SPARE TIRE BY ELECTRO-ELECTRONIC MEANS for driving and motion of the spare wheel and tire externally and, fixed at the bottom of the vehicle, allowing said spare wheel and tire, moved up and down comprising: one upper body (1), with one anterior side (4) fixed to one horizontal tube (2) and, to one vertical tube (14) in one posterior cover (5) by at least four prisoner pins (7) with washers (p) in the bores (9), containing one motion mechanism internally to said horizontal tube (2) formed by one metallic reel (10) fixed by bearings (6) on both ends;

wherein the driving up and down of the spare wheel and tire taking place through one motion tape (16) fixed to the metallic reel (10) on one end, and wound on itself, around said reel (10), and containing on the other end one triangular step board (17) with one rod (17) and lower base (19).

2. According to claim 1, Characterized by the fact of the driving and motion of the spare wheel and tire taking place through one micro engine (15) fixed on the posterior cover (5) causing the axis (22), upon being fitted on the channel (12) of the metallic reel (10), to allow the electric motion of said metallic reel (10) to both sides, causing the motion tape to (16) spin up and down.

3. According to claim 1, Characterized by the fact that the micro engine (15) is interlinked to a PCI central (24), which performs the energy management to feed the micro engine (15), as well as the programming of the motion course from one side to another, of the motion mechanism, in addition to the end of course, both up and down.

4. According to claim 1, Characterized by the fact that the motion tape (14) is totally inserted inside the horizontal tube through channel (23) and, by the fact that the rod (17) with the end of said motion tape (16) standing against cuts inside the vertical metallic tube (14).

\* \* \* \* \*